United States Patent [19]

Melley, Jr.

[11] 4,136,432

[45] Jan. 30, 1979

[54] MOBILE ELECTRIC POWER GENERATING SYSTEMS

[75] Inventor: Joseph F. Melley, Jr., Davie, Fla.

[73] Assignee: Melley Energy Systems, Inc., Fort Lauderdale, Fla.

[21] Appl. No.: 759,211

[22] Filed: Jan. 13, 1977

[51] Int. Cl.² .................................... H02P 9/00
[52] U.S. Cl. ................................... 29/469; 310/89; 290/1 A
[58] Field of Search ............. 29/469; 290/1 A, 1 R, 290/3; 296/137 B; 310/89

[56] References Cited

U.S. PATENT DOCUMENTS

| | | | |
|---|---|---|---|
| 2,177,687 | 10/1939 | Bracken et al. | 290/1 A |
| 2,386,597 | 10/1945 | Couse | 290/1 A |
| 2,789,234 | 4/1957 | Lambert et al. | 290/1 R |
| 3,140,116 | 7/1964 | Speas | 296/137 B |
| 3,773,380 | 11/1973 | Stockdill | 296/137 B |

*Primary Examiner*—Milton S. Mehr
*Attorney, Agent, or Firm*—Jerold A. Jacover

[57] ABSTRACT

An improved mobile electric power generating system comprising a substantially enclosed trailer for housing a power plant is disclosed. The improvements reside in removable means permitting access to the interior of the trailer enclosure for facilitating improved assembly and maintenance of the power plant. Additional features permit improved operation of the system, and improved methods for assembling the same.

4 Claims, 10 Drawing Figures

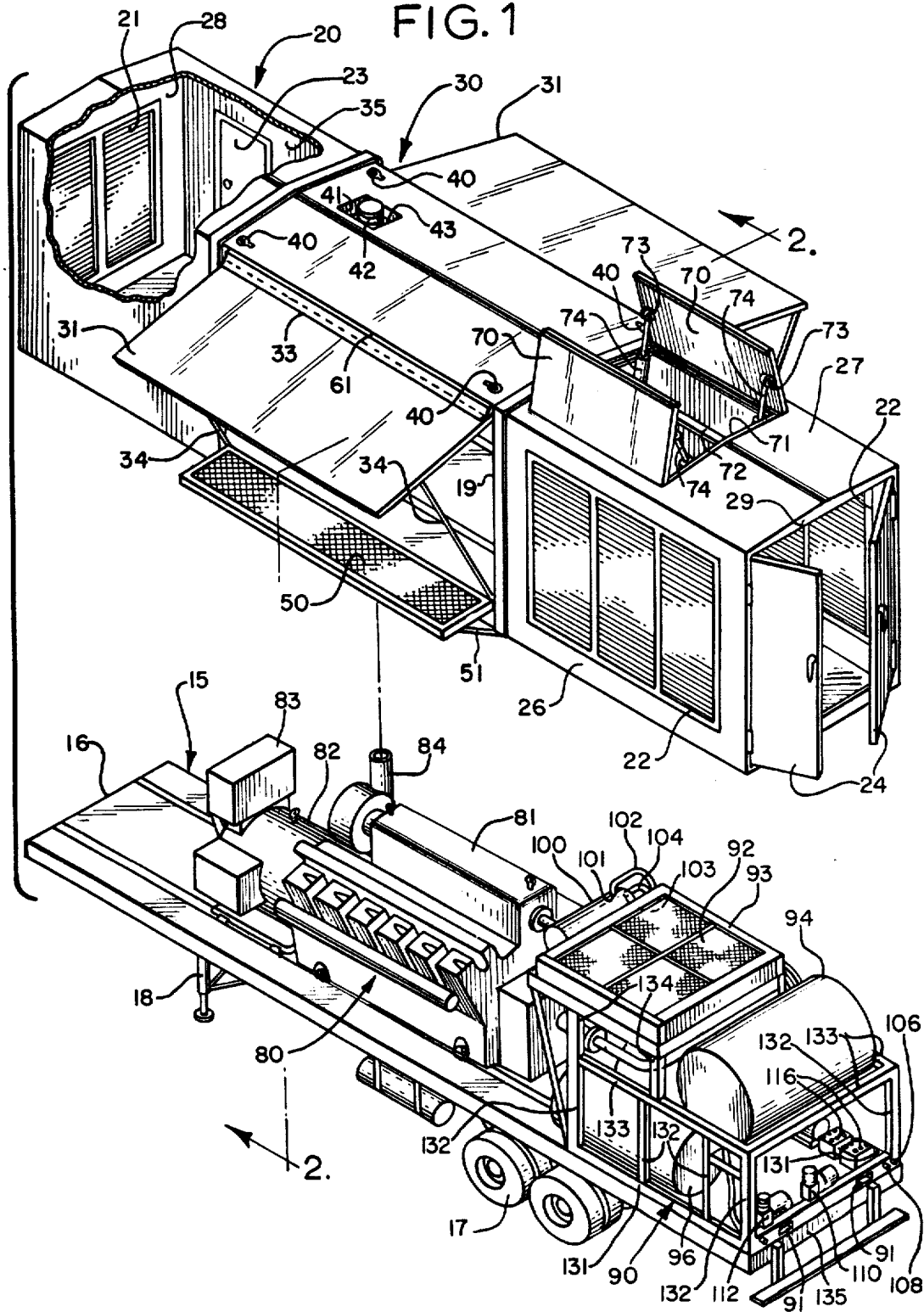

U.S. Patent  Jan. 30, 1979  Sheet 2 of 4  4,136,432
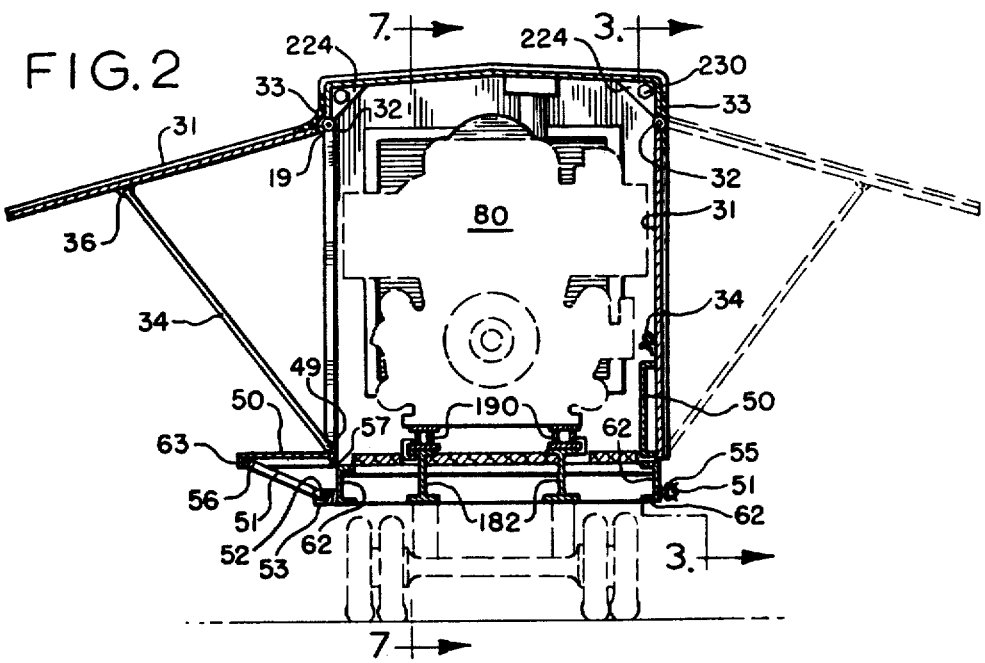
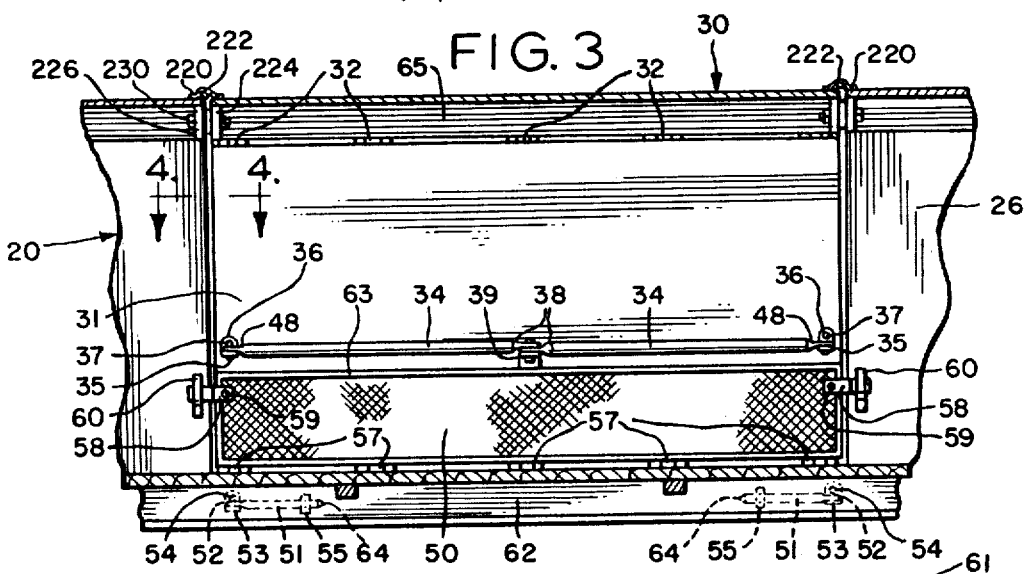
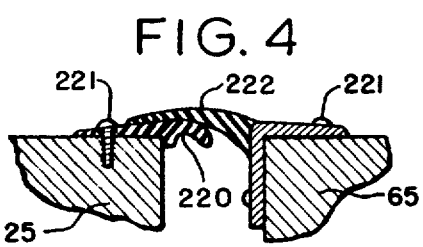
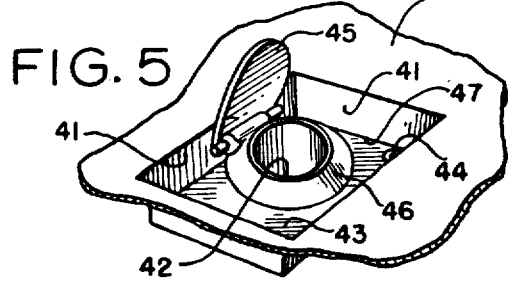

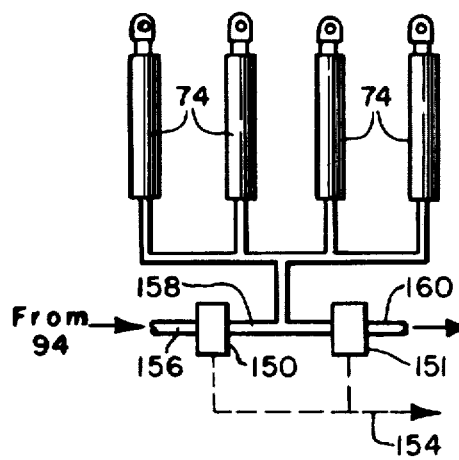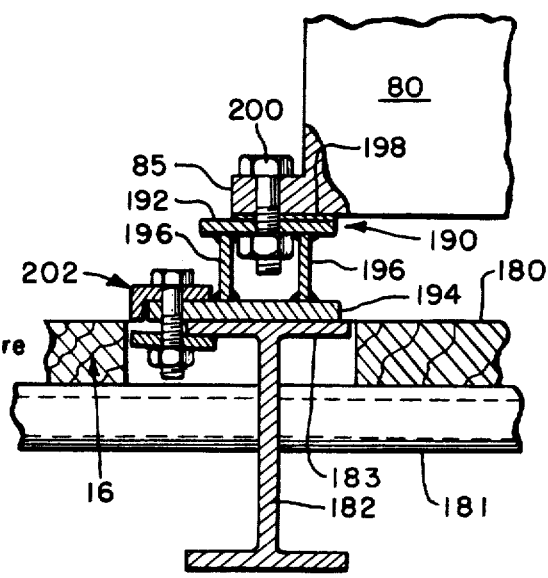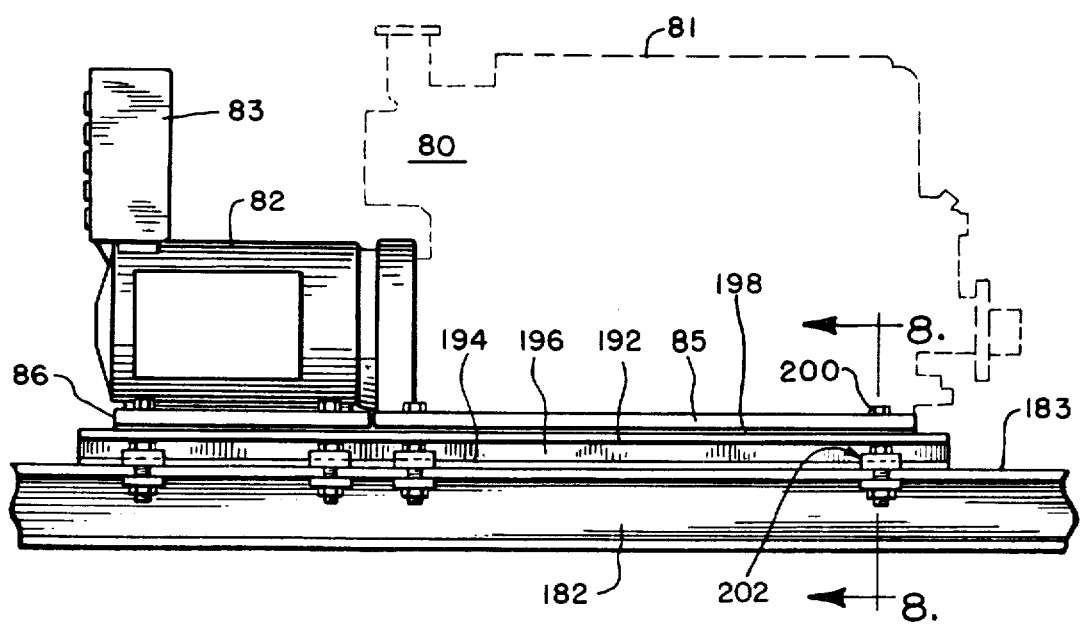

the invention relates to improvements in mobile electric power generating systems. More particularly, the invention relates to improvements in mobile electric power generating systems of the type comprising an enclosed trailer for carrying prodigious electric power generating equipment.

MOBILE ELECTRIC POWER GENERATING SYSTEMS

BACKGROUND

Introduction

This invention relates most generally to mobile electric power generating systems. More particularly, the invention relates to improvements in mobile electric power generating systems of the type comprising an enclosed trailer for carrying prodigious electric power generating equipment.

This invention also pertains to improvements in trailer enclosures which provide better access to, and facilitate improved assembly of trailer-mounted electric power generating systems having generating capacities ranging from about 100 kilowatts up to and exceeding 1000 kilowatts.

Trailer-mounted electric power generating equipment of the type described is designed as an independent, self-contained, source of electricity. The trailer is typically towed to a remote site, often in tropical or desert areas, where electric power is needed but unavailable through more conventional means. It is highly desirable that within a short time after arrival at the site, all necessary preparations will be promptly completed, so that large scale electric power generation can begin without prolonged delay. It is also desirable that these preparations be carried out with minimal skill, and without the aid of relatively sophisticated tools and equipment.

One important element of the mobile electric power generating system of the type described is the enclosure which houses the electric power generating equipment. This enclosure provides necessary protection for generating equipment from the dirt, sand, water, and weather of the generating environment. Though protection from the generating environment is desirable, this has been accomplished heretofore usually at the expense of such other desirable features as the ease with which the electric power generating equipmemt may be assembled and mounted within the enclosure; the ease with which maintenance of the generating equipment may be performed within the enclosure; the ease with which the generating equipment may be operated; and the degree of on-site assembly required. It is thus a primary object of the invention to provide a mobile electric generating system which protects the electric power generating equipment from the generating environment without sacrificing the foregoing features.

In mobile electric power generating systems of the type described, it is also highly desirable that the system components be fabricated and assembled expeditiously, to minimize construction time and expense. In the past, however, such systems have typically been constructed in a relatively cumbersome and inefficient piece-by-piece manner. Such methods are not only somewhat costly and time consuming, they do not make maximum use of the limited trailer space available. Accordingly, it is another object of the invention to provide improved methods of fabricating and assembling mobile electric power generating systems to provide heretofore unknown economies in trailer space and construction time.

Other objects, features and advantages, including improved apparatus, operations, and methods, will become more apparent hereinafter.

SUMMARY OF THE INVENTION

According to one aspect of the invention there is provided a trailer enclosure for mounting and housing electric power generating equipment including a power plant. This enclosure has a section which may be removed from the trailer as a unit to provide an access through which the power plant may be installed on the trailer.

In another aspect of the invention, efficient fabrication of mobile electric power generating systems is achieved through the steps of providing a trailer bed with an enclosure having a removable section, removing the removable section to provide an access to the trailer bed, moving the power plant through the access provided by the removal of the removable section, installing the power plant on the trailer bed, and replacing the removable section. Use of this removable section in the trailer enclosure eliminates the need to construct the enclosure over the power plant after it has been installed on the trailer bed, thereby reducing the time and cost of fabrication.

The removable section of the trailer enclosure described above also permits engine maintenance, without moving the power plant off of the trailer. Thus, in another aspect of the invention, ready access to the power plant may be gained for purposes of major engine maintenance by removing this section of the enclosure.

DESCRIPTION OF THE DRAWINGS

The novel aspects and features of the electric power generating system summarized above are defined in the appended claims. However, certain aspects of the invention itself, together with further objects and attendant advantages, will be best understood by reference to the following detailed description taken in connection with the accompanying drawings, in which:

FIG. 1 is an exploded view, taken in perspective, of one aspect of the electric power generating system of the invention;

FIG. 2 is a plan view of the rear of the system illustrated in FIG. 1;

FIG. 3 is a sectional view taken along lines 3—3 of FIG. 2;

FIG. 4 is a sectional view taken along lines 4—4 of FIG. 3;

FIG. 5 is an enlarged perspective view of a portion of the system illustrated in FIG. 1;

FIG. 6 is a schematic view of a feature of the system illustrated in FIG. 1;

FIG. 7 is a plan view of a feature of the system illustrated in FIG. 1;

FIG. 8 is a sectional view taken along lines 8—8 of FIG. 7;

DETAILED DESCRIPTION OF EXEMPLARY EMBODIMENTS

Figure 9:
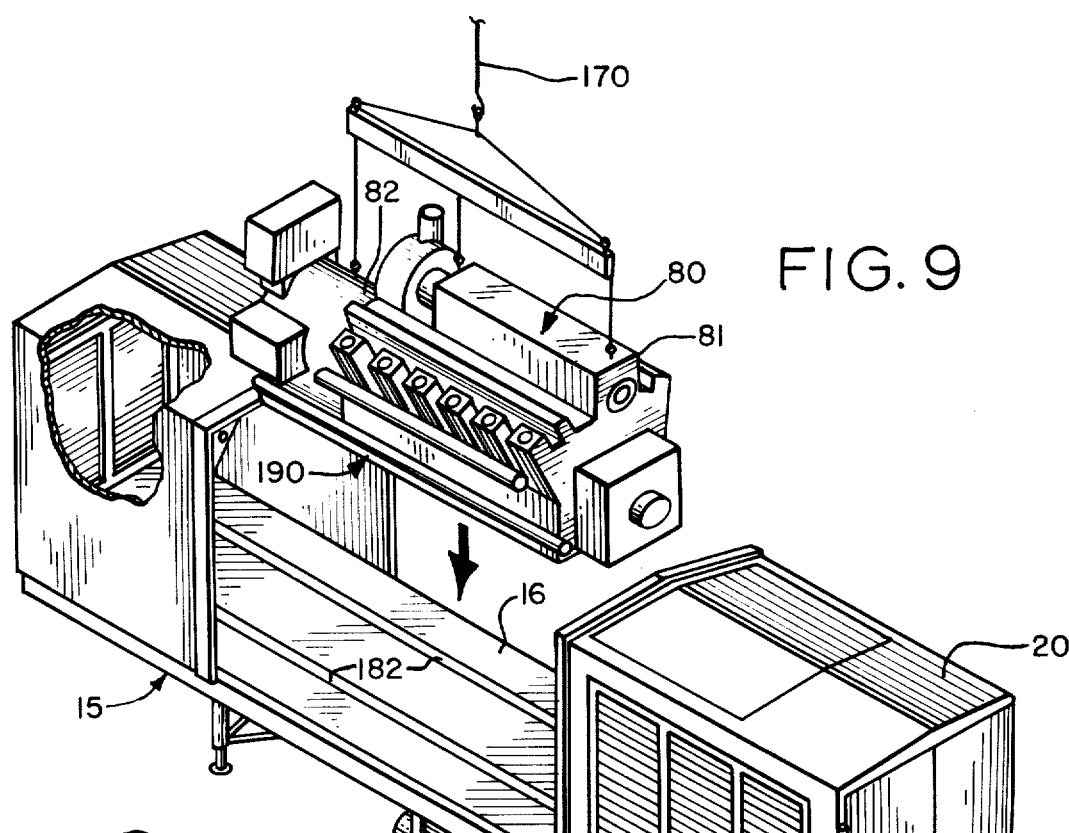
FIG. 9 is a perspective view of a portion of the system illustrated in FIG. 1 showing one aspect of the assembly of the system.

Referring first to FIG. 1, one preferred embodiment of the mobile electric power generating system of the invention is illustrated. This embodiment includes a trailer 15, a trailer enclosure 20, a power plant 80, and a utility frame 90. These components, which are combined to form a self-contained mobile electric power generating system, will be described in greater detail below.

In general, trailer 15 includes a substantially flat bed 16, and a conventional tandem axle, eight-tire wheel structure 17. Trailer 15 is arranged to be hitched to, and towed by, a tractor (not shown) in a manner well known in the art. Conventional supports 18 are secured to the underside of bed 16, and are arranged to help support the forward portion of trailer 15 when the tractor is not hitched thereto. With the exception of special computer brakes, trailer 15 generally conforms to all of the regulations promulgated by the United States Department of Transportation. Thus, in one preferred embodiment, trailer 15 is approximately 40 feet long and eight feet wide, and with enclosure 20 attached, is approximately 12 feet, seven inches in height.

In this embodiment, enclosure 20 of trailer 15 is a hollow, five-sided shell comprising a pair of side walls 25, 26, a top wall 27, a front wall 28 and a rear wall 29. Disposed in rear wall 29 are a pair of rear doors 24 which, when opened, provide an access to trailer bed 16 substantially equal in area to the cross-sectional area of enclosure 20. The rearward portions of both side walls 25 and 26 define louvered portions 22. Louvers 21, of similar construction to louvered portions 22, are defined in front wall 28. A utility door 23, primarily used to provide access for personnel, is located near the forward end of side wall 26.

In this embodiment, removable section 30 of enclosure 20 is located substantially at the center thereof. Removable section 30 includes two canopies 31, and two platforms 50. Canopies 31 may be opened to provide access to trailer bed 16 from outside trailer 15 and platforms 50 may be lowered after canopies 31 are opened, to form a work area adjacent to power plant 80. Removable section 30, which forms an integral part of the enclosure 20 when mounted on trailer bed 16, may be lifted off of trailer 15 as a unit, permitting free access to the equipment therein, particularly the top and sides of power plant 80.

Power plant 80 typically includes an electric power generator 82, and an engine 81 for turning generator 82. Power plant 80 may also include a control panel 83 for monitoring and operating both engine 81 and generator 82. In one preferred embodiment, engine 81 is a V-12 turbocharged diesel manufactured by Waukesha Engine Division of Dresser Industries and identified as Waukesha Model Number L5792DSIU. The generator 82, to which this engine is preferably connected, is a 600 KW electrical generator manufactured by Kato Engineering Co.

At least many of the support systems for power plant 80 are carried by a utility frame 90. These support systems may include various fuel and air tanks, motors, heat dissipation means and other apparatus which are all described in greater detail hereinafter. The use of utility frame 90 for mounting the support systems for power plant 80 permits the system to be installed within enclosure 20 as a single unit. This, of course, eliminates the need for separately installing all of the various tanks, motors, and other apparatus, thereby minimizing the time and costs of assembly, and providing maximum economies of space.

The embodiment shown in FIG. 1 has a gross weight of approximately 57,000 pounds, and is capable of reliably generating about 600 kilowatts of electrical power. Nonetheless, it can be expeditiously assembled, transported, operated and maintained.

Still referring to FIG. 1, it will be seen that side walls 25, 26 of enclosure 20 are joined to top wall 27, front wall 28, and rear wall 29 to form a bottomless structure which is fixed to trailer bed 16. Louvers 21, mounted in front wall 28, and louver portions 22 mounted in the rear sections of side walls 25, 26, are equipped with air filter elements (not shown) and thereby provide openings through which filtered air is drawn into the trailer for engine induction and engine and generator cooling. Induction air is exhausted from the trailer through an engine exhaust pipe 42. Engine and generator cooling air is exhausted through a top opening 71 in top wall 27.

Though access to the interior of the enclosure 20 for machinery and personnel is provided by rear doors 24, and auxiliary access is provided by utility door 23, a more extensive access 19 is provided upon opening canopy panels 31 as illustrated in FIGS. 1 and 2. More particularly, when opened, canopy panels 31 define access to the interior of enclosure 20, and when closed, they form an integral part of side walls 25, 26.

Canopy panels 31 are substantially rigid pieces coated on their inside surfaces with a layer of urethane foam (not shown) approximately one inch thick. This urethane layer provides structural strengthening as well as sound insulation. Panels 31 are fastened to side walls 25, 26 by hinges 32. A strip of water-resistant fabric 33 is secured over each hinge 32 to retard the flow of rain water which might otherwise seep into the interior of enclosure 20.

As best shown in FIG. 3, two canopy support rods 34 are provided for each canopy panel 31. Each support rod 34 is a substantially rigid member capable of supporting the weight of canopy panel 31. Each of support rods 34 defines a pivoted end 48 and a secured end 38. Pivoted end 48 is pivotally attached to a canopy support rod mounting bracket 36 through a first pivot 35. Each mounting bracket 36 is rotatably attached to a canopy panel 31 at a second pivot 37.

When canopy panel 31 is closed, the secured end 38 of each support rod 34 is fastened to a support rod storage bracket 39 extending from canopy panel 31. When canopy panel 31 is opened, the secured end 38 of support rod 34 is fastened to a support rod securing bracket 49 shown in FIG. 2. When so fastened, canopy panel 31 will be securely held in its open position.

Movable platforms 50, which are preferably attached to enclosure 20, are rigid panels which serve as a work area adjacent to power plant 80 when in their open or horizontal position. As shown in FIG. 3, each platform 50 is provided with hinges 57 which are secured to side walls 25, 26. Hinges 57 allow platforms 50 to be moved from a closed or vertical position inside of enclosure 20, shown in FIG. 2, to the open position outside of enclosure 20 shown in FIG. 3. A platform locking plate 58 is attached to each end of platform 50 through a locking pivot 59. The platforms 50 may be locked in their closed or vertical position by rotating locking plate 58 until it is captured in the space between the side walls 25, 26 and a locking flange 60.

Platforms 50 are supported in their open, horizontal position by platform support arms 51. These support arms 51 are pivotally attached to support brackets 53 which are rotatably attached to a trailer side frame member 62 through support bracket pivots 54. Support arm-receiving sockets 56 are provided in the outmost edge 63 of platforms 50 for holding platforms 50 in their open position. Spring clips 55 are provided on trailer side frame member 62 to hold support arms 51 against the trailer frame when platforms 50 are stowed in their vertical position.

The procedure for opening canopy panels 31 and deploying platforms 50 from their closed positions can be best understood by referring to FIGS. 2 and 3. First, each canopy panel 31 is manually raised to define access 19. Access 19 renders the stowed canopy support rods 34 accessible from outside enclosure 20. Secured ends 38 of support rods 34 are then lifted off of storage bracket 39. Support rods 34 can then be pivoted about pivots 34 and 37 attached to securing bracket 49 to maintain each canopy panel 31 in its open position.

After canopy panels 31 have been moved to their open position, platforms 50 may be deployed. This is accomplished by rotating locking plates 58 until they are no longer secured between one of side walls 25, 26 and locking flange 60. Platform 50 can then be swung outwardly on hinges 57. To support the platforms 50 in their horizontal positions, platform support arms 51 are released from spring clips 55 and pivoted about the pivots 52 and 54 until the free ends 64 of support arms 51 are positioned within support arm receiving sockets 56. Once deployed, the platform 50 provides a stable work area adjacent to the power plant 80. Operating or service personnel can thus reach power plant 80 through access 19 defined by the opening of canopy panels 31. Moreover, since the width of power plant 80 is typically somewhat less than, but substantially equal to the width of trailer bed 16, the work area provided by platforms 50 facilitate the movement and activity of personnel on trailer 15 even after power plant 80 has been mounted thereto.

As previously discussed, trailer enclosure 20 is provided with a removable section which in the embodiment of FIG. 1 comprises removable center section 30. Removable section 30 may be lifted off of trailer bed 16 to provide unrestricted top and side access to power plant 80. Removable section 30 includes a top section 61 and a downwardly-extending frame portion 65 as shown in FIG. 4. Canopy panels 31 are attached to frame portion 65 of removable section 30 with hinges 32, and gussets 224 are installed in the upper corners of removable section 30. When removable section 30 is mounted on trailer bed 16, gussets 224 are aligned with facing gussets 226 mounted at appropriate places on enclosure 20. Fastening means 230 cooperating with gussets 224 and 226, secure removable section 30 of enclosure 20.

Weather stripping elements 220 and 222, shown best in FIG. 4, are attached to the sides and top of enclosure 20 and removable section 30, respectively. These weather-stripping elements are preferably fabricated from a flexible, rubberlike material. By covering the joint between removable section 30 and enclosure 20, weather stripping elements 220 and 222 inhibit water and other foreign material from entering the enclosure.

As shown in FIG. 1, top section 61 of removable section 30 includes four brackets 40. These brackets are mounted near the four corners of top section 61 and serve as gripping means for cable hooks or the like (not shown) which are used to lift the entire center section 30 from enclosure 20 when it is being removed from, or installed on, trailer bed 16. The cable hooks may be attached to a cable which is most conveniently lifted with a crane or derrick.

Another feature of this preferred embodiment can be best understood by referring to FIG. 5. More particularly, in FIG. 5 there is illustrated a recess 47 in top section 61 defined by side walls 41 and a floor 43. Disposed in floor 43 is a drain 44 for draining water from recess 47. Also disposed in floor 43 is an exhaust pipe 42 equipped with a rain flap 45, and a rain skirt 46. Rain skirt 46 provides a rainproof seal between exhaust pipe 42 and floor 43. When removable section 30 is mounted on trailer bed 16 over power plant 80, including engine 81, exhaust pipe 43 is connected to an engine silencer 84 shown in FIG. 1. By installing exhaust pipe 42 within recess 47 it is possible to permanently mount the exhaust pipe in top section 61 without it extending thereabove. Since assembly of exhaust pipe 42 does not increase the height of the mobile electric power generating system, the assembled system can be transported without interference from low bridges and viaducts. Moreover, by attaching exhaust pipe 42 prior to transporting the system to the generating site, the amount of time and effort required to make the system operative upon arrival at the generating site is substantially reduced.

In another aspect of the embodiment illustrated in FIG. 1, there is provided a pair of ceiling gates 70 which are hinged to top wall 27 of enclosure 20. When closed, ceiling gates 70 rest on a center strut 72 and form a substantially flush interface with top wall 27. When opened, however, gates 70 uncover an opening 71 which is located directly above a horizontally-mounted radiator 92. The size of opening 71 is preferably somewhat greater than that of radiator 92, thereby permitting air which has been heated by radiator 92 to escape from enclosure 20.

On each of gates 70 there is preferably mounted two air cylinder mounting brackets (not shown). Four hydraulic air cylinders 74 are mounted, each with one end pivotally secured to the air cylinder mounting bracket and the other end pivotally secured to a radiator frame 93 (FIG. 1) supporting radiator 92. Air cylinders 74 are used to control the position of gates 70, i.e., to open and close the same. Thus, when air cylinders 74 are in their collapsed position, gates 70 are closed, and when air cylinders are extended, gates 70 are opened.

The operation of air cylinders 74, and hence the position of gates 70, is determined by the air pressure in an air supply line 158 which supplies compressed air to the four air cylinders 74. Air supply line 158, an associated air inlet solenoid 150 and a vent solenoid 151, and air cylinders 74, are all shown schematically in FIG. 6.

The source of compressed air used to actuate air cylinders 74 is preferably in the form of one or more compressed air tanks 94 which are discussed hereinafter. The compressed air from tank 94 flows through air inlet line 156 into inlet solenoid 150 which is normally closed. When inlet solenoid 150 is energized, however, the solenoid opens and compressed air passes into an air cylinder supply line 158, which serves to conduct the compressed air to the air inputs of each of the four air cylinders 74. Also connected to air cylinder supply line 158 is vent solenoid 151 which is normally open. When open, vent solenoid 151 allows compressed air to flow from air cylinder supply line 158, into an air cylinder vent line 160, where it is vented to the atmosphere.

Solenoids 150 and 151 are energized in unsion by an increased voltage on an electrical line 154 which is coupled to control panel 83. When the voltage on line 154 so increases, and solenoids 150 and 151 are energized, inlet solenoid 150 switches open and vent solenoid 151 switches closed. With the solenoids switched in this manner, compressed air in input line 156 is allowed to flow to the air cylinder 74, thereby causing the extension of air cylinders 74 and the opening of gates 70. Since vent solenoid 151 is closed at this time, compressed air in supply line 158 is prevented from escaping to the atmosphere via vent line 160.

When the voltage on line 154 decreases, solenoids 150 and 151 are de-energized. Inlet solenoid 150 therefore closes, shutting off the flow of compressed air to air cylinders 74, and vent solenoid 151 opens, allowing compressed air trapped in the supply line 158 and the air cylinders 74 to escape to the atmosphere through vent line 160. The weight of gates 70 compresses the air cylinders 74 so that the gates fall to their closed position against center strut 72. The rate at which gates 70 close is determined by the rate at which air is allowed to escape through vent line 160.

As mentioned above, the electrical signal at line 154 which controls the positions of solenoids 150 and 151 is generated at the control panel 83. When the start-up procedure for the engine 81 is initiated, a source of voltage is automatically applied to line 154. This causes gates 70 to be automatically raised prior to actual engine start-up. This voltage is maintained on line 154 throughout the period of engine operation and is removed only after engine 81 is stopped. Thus, the top gates 70 are automatically opened, and held open, only during the operative sequence of engine 81.

Turning now to FIGS. 7 and 8, the apparatus for securing power plant 80, including engine 81 and generator 82, to trailer bed 16 is shown. Both engine 81 and generator 82 are mounted on a pair of transition pieces 190 which are in turn clamped to a pair of main frame members 182. As shown in FIG. 1, frame members 182 are parallel I-beams which extend substantially the entire length of trailer bed 16. Frame members 182 have an upper flange 183 which, along with a floor sill structure 181, serves to support the flange 180 of trailer bed 16.

Each transition piece 190, which is mounted between the base of power plant 80 and each of main frame members 182, is an elongated structure comprising a top plate 192, two side plates 196, and a bottom plate 194 preferably of somewhat greater width than that of top plate 192. The four plates comprising each transition piece 190 are preferably welded together to form a single unit.

Engine 81 and generator 82 have at their base a number of mounting flanges 85 which are secured to top plate 192 of transition piece 190 with bolts 200, or other suitable fasteners. Shims 198 are placed between top plate 192 and the bottom of mounting flanges 85 in order to properly align the engine and the generator on the transition piece. Bottom plate 194 of transition piece 190 is preferably secured to upper flange 183 of main frame member 182 by clamp means 202.

In one aspect of the preferred method of assembling the mobile electric power generating system, engine 81 and generator 82 are secured to transition pieces 190 so that power plant 80 can be handled as a unit. Removable section 30 is then removed and, as shown in FIG. 9, power plant 80 is lowered onto trailer bed 16 via hoisting apparatus 170. Thereafter, transition pieces 190 are secured to main frame members 182 in the manner described, and removable section 30 is reattached to enclosure 20.

Figure 10:
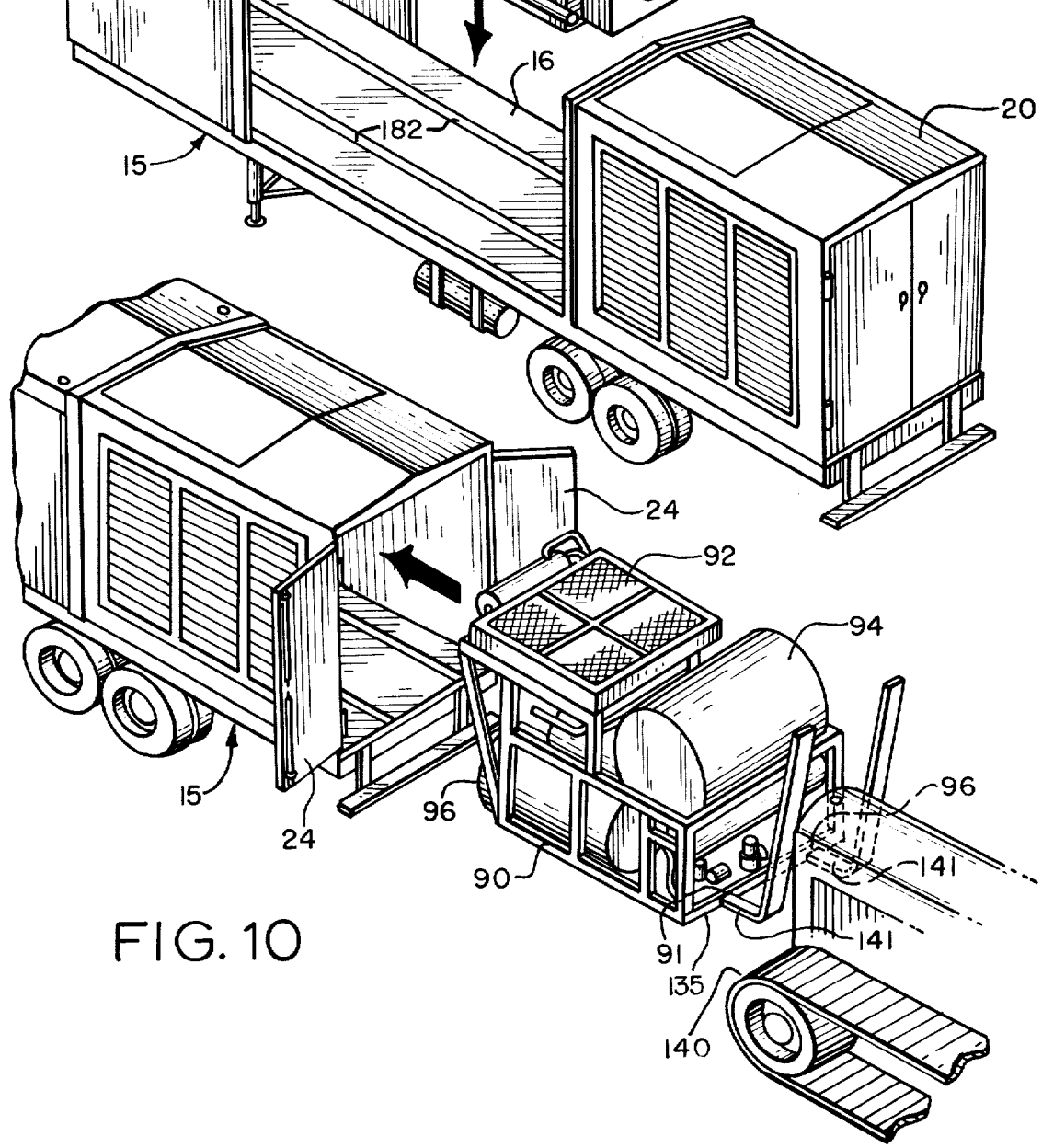
FIG. 10 is a perspective view of a portion of the system illustrated in FIG. 1 showing another aspect of the assembly of the system.

In another aspect of the preferred method of assembling the mobile electric power generating system, frame 90, with various power plant support systems secured thereto, is installed after power plant 80 is secured to trailer bed 16. One embodiment of frame 90 is illustrated in FIGS. 1 and 10. More particularly, in FIG. 1 there is shown a unique frame configuration which, in this embodiment, is arranged to carry all of the various power plant support systems on a single module. This has the very important advantage of permitting all of these support systems to be mounted on trailer bed 16 at once. Not only does this reduce the time and cost of assembly, but it provides maximum economies of space.

Still referring to FIG. 1, frame 90 is shown to include a framework 131 defining a substantially rectangular mounting area. Extending upwardly from framework 131 are a plurality of struts 132 which support a second framework 133 also defining a substantially rectangular mounting area. Second framework 133 is substantially the same size as framework 131, and is disposed in such a way that the rectangular mounting area defined by framework 133 is immediately above the rectangular mounting area defined by framework 131.

Extending upwardly from second framework 133 are a plurality of struts 134 supporting a third framework previously identified as radiator frame 93. Radiator frame 93 is mounted in cantilever fashion so that a forward position thereof extends beyond the most forward portion of rectangular mounting area defined by frameworks 131 and 133.

Radiator frame 93 which is disposed near the top of enclosure 20 defines a radiator support region for a horizontally disposed radiator 92. Secured to utility frame 90 near radiator 92 is a fluid reservoir 100 having a fill opening 101 for introducing a coolant into reservoir 100. Extending from fill opening 101 is a coolant fill conduit 102. Reservoir 100 also has an overflow opening 103 for passing overflow coolant from reservoir 100. Extending from overflow opening 103 is a coolant overflow conduit 104.

The rearward portion of framework 133, i.e., that part of framework 133 which is not covered by radiator frame 93, is arranged to carry at least one storage tank, such as tank 94, preferably for compressed air which is used as start-up energy for engine 81. Hence, the rearward portion of framework 133 is sometimes referred to herein as a storage tank support region. The space underlying radiator frame 93 but above framework 133 is arranged to be occupied by radiator support apparatus such as a fan, water pipes and the like, and therefore this space is sometimes referred to herein as a radiator support region.

The space between all but the most rearward portion of framework 133, and all but the most rearward portion of framework 131 is also arranged to be occupied by at least one storage tank, such as tank 96, preferably for diesel fuel used for powering engine 81. Hence, this space is also sometimes referred to herein as a storage tank support region. Finally, the space between the rearward most portions of frameworks 131 and 133 is arranged to be occupied by engine support means such as a gas air compressor 110. This space may also be occupied by an auxiliary air compressor 112 operated by the electric power developed by power plant 80 to refill tank 94 and a battery 116 which may include a battery charger. This space is therefore sometimes referred to herein as an engine support region.

Also disposed in the engine support region of utility frame 90 is a coolant fill point 106 connected to coolant fill conduit 102, and a coolant overflow point 108 connected to coolant overflow conduit 104. Means are provided for pumping coolant, supplied at coolant fill point 106, through conduit 102 and opening 101, into reservoir 100. When reservoir 100 is filled, coolant will overflow from opening 103, pass through conduit 104, and appear at overflow point 108. In this manner, coolant can be provided to the relatively inaccessible reservoir 100 at the more accessible fill point 106. Similarly, an operator can readily determine when reservoir 100 is full, without climbing up to the relatively inaccessible reservoir 100, simply by observing whether overflow coolant is being passed at coolant overflow point 108.

In this embodiment of utility frame 90, framework 131 also includes a rear member 135 defining a pair of fork receptacles 91. The spacing and size of fork receptacles 91 is arranged to accommodate the forks 141 of a conventional fork lift truck 140 shown in FIG. 10. Thus, after radiator 92 has been mounted in the radiator support region, start-up energy storage tank 94 is mounted in one storage tank region, fuel storage tank 96 is mounted in the other storage tank region, the radiator support apparatus is mounted in the radiator support apparatus region, and the engine support means are mounted in the engine support region, utility frame 90 can be easily moved by a fork lift truck through doors 24 of trailer 15 and installed on trailer 16. Thereafter the various apparatus mounted on frame 90 need only be interconnected with power plant 80 to substantially complete the assembly of the mobile electric power generating system.

After the system has been completely assembled, it is towed to a generating site and prepared for operation. The start-up sequence is begun by crank starting gasoline-driven air compressor 110.

The air from compressor 110 or 112 supplies air tank 94. At about this time, a lubricating sequence is also initiated. Preferably when this sequence is properly completed, a voltage signal is automatically provided at line 154 to actuate solenoids 150 and 151, thereby opening gates 70. Shortly thereafter, compressed air is supplied from tank 94 to engine 81 to start the same. Fuel is passed to engine 81 from fuel tank 96, permitting continuous operation of engine 81 after start-up. Engine 81, of course, drives generator 82, thereby providing a reliable electrical power output.

From the foregoing description, the various features and advantages of this exemplary embodiment should be apparent. In summary, however, it should be noted that the modularization of power plant 80 and the various apparatus mounted on utility frame 90 permits expeditious assembly of the entire system. Assembly and maintenance are further expedited through the use of removable section 30.

It should be further noted that, because of the prodigious size of power plant 80, and the necessary space limiations of trailer 15, there is very little room inside enclosure 20 particularly in the immediate vicinity of power plant 80. This problem is aggravated when the width of power plant 80 is slightly less than, but substantially equal to, the width of trailer 15. Under such circumstances, canopy 30 and platform 50 provide access to power plant 80, and sufficient work space to facilitate assembly, maintenance, and operation. The space limitations of trailer 15 also emphasize the advantages afforded by the unique configuration of utility frame 90 which permits the various apparatus mounted thereon to be installed in a most compact manner.

The numerous features of the system described are also highly advantageous. These features include the recessed exhaust system, the automatically operative ceiling gates, and the specially designed coolant fill and overflow apparatus.

Though the embodiment herein described is preferred, other embodiments are also exceedingly useful. For example, in situations where more massive power plants are utilized, proper weight distribution may require that they be located more directly over wheel assembly 17. In such a case, double doors are provided in the front wall of enclosure 20, and utility frame 90 is moved therethrough. In such a case, the removable section 30 may not constitute the center of enclosure 20, but would likely incorporate the entire rear portion thereof.

It is thus apparent that numerous embodiments which come within the purview of the invention may exist. It is also apparent that those skilled in the art may devise various modifications and refinements which do not part from the true scope of the invention. Accordingly, all such embodiments, and all such modifications and refinements, are intended to be covered by the appended claims.

I claim:

1. In a substantially enclosed trailer, having a top and at least two side walls, of predetermined width for carrying a power plant having a size less than but substantially equal to the width of said trailer:
   - means defining an opening in said trailer, for promoting the passage of heat produced by said power plant;
   - a removable section comprising a portion of said top and portions of said side walls of said trailer, said portions of said top and said side walls forming a substantially rigid structure adapted to be removed from said trailer as a unit to provide access to the top and sides of said power plant from outside said trailer;
   - automatic means comprising gate means having a first position covering said opening and a second position uncovering said opening, means producing a signal during a start-up condition of said power plant, and means responsive to said signal for actuating said gate means from said first position to said second position; and
   - canopy means, forming a portion of at least one of the side walls of said trailer when said canopy means are in a first location, movable from said first location to a second location beyond said predetermined width of said trailer; said canopy means, when in said second location, defining a canopy extending over an area beyond said predetermined width of said trailer permitting access to said power plant from outside said trailer.

2. A method for fabricating a mobile electric power generating system comprising a power plant including an electric generator and an engine for driving said generator, power plant support means including fuel storage means, start-up energy storage means, and heat dissipation means, and a substantially enclosed trailer having a bed and a removable top portion, comprising the steps of:
   - securing said electric generator and said engine to a transition piece to provide a mountable power plant;

removing said top portion to provide an access through the top of said trailer to said bed;

positioning said mountable power plant through said access onto said bed;

securing said transition piece to said bed;

securing said power plant support means on a utility frame;

securing said utility frame to said bed; and interconnecting said power plant support means and said power plant.

3. The method defined in claim 2 further includes the step of:

replacing said top portion on said trailer.

4. A method for fabricating a mobile electric power generating system comprising a power plant including an electric generator and an engine for driving said generator, power plant support means including fuel storage means, start-up energy storage means, and heat dissipation means, and a trailer adapted to have a removable top portion for providing an access to said bed, comprising the steps of:

securing said electric generator and said engine to a transition piece to provide a mountable power plant;

positioning said mountable power plant through said access onto said bed;

securing said transition piece to said bed;

securing said power plant support means on a utility frame;

securing said utility frame to said bed; and interconnecting said power plant support means and said power plant.

* * * * *